United States Patent
Kipman et al.

(10) Patent No.: US 7,337,428 B2
(45) Date of Patent: Feb. 26, 2008

(54) AUTOMATIC BATCHING OF TASKS IN A BUILD PROCESS

(75) Inventors: Alex Aben-Athar Kipman, Duvall, WA (US); Rajeev Goel, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 731 days.

(21) Appl. No.: 10/772,791

(22) Filed: Feb. 5, 2004

(65) Prior Publication Data

US 2005/0177824 A1 Aug. 11, 2005

(51) Int. Cl.
*G06F 9/45* (2006.01)
(52) U.S. Cl. ...................................... 717/100
(58) Field of Classification Search .................. 717/100
See application file for complete search history.

(56) References Cited

U.S. PATENT DOCUMENTS

| | | | | |
|---|---|---|---|---|
| 5,542,070 A | * | 7/1996 | LeBlanc et al. ............... 703/20 |
| 5,758,160 A | * | 5/1998 | McInerney et al. .......... 717/104 |
| 5,774,661 A | * | 6/1998 | Chatterjee et al. ........... 709/203 |
| 5,789,252 A | * | 8/1998 | Fujita et al. ................... 436/49 |
| 6,195,685 B1 | * | 2/2001 | Mukherjee et al. .......... 709/205 |
| 6,546,397 B1 | * | 4/2003 | Rempell ...................... 707/102 |
| 2003/0182364 A1 | * | 9/2003 | Large et al. ................. 709/203 |
| 2004/0015831 A1 | * | 1/2004 | Bowhill ....................... 717/106 |

OTHER PUBLICATIONS

Tomono, M., "An Event Notification Framework based on JAVA and COBRA", *Integrated Network Management (Proc/IFIP/IEEE Int Symp)*, 1999, 563-576.
Cincom Enhances Mantis with Release 4.0, *Database and Network Journal*, 1985, 15, 11-12.

* cited by examiner

*Primary Examiner*—John Chavis
(74) *Attorney, Agent, or Firm*—Woodcock Washburn LLP (57) ABSTRACT

Re-useable build tasks are analyzed and tasks with identical attribute values are grouped together into batches, and the task is executed once for each batch, eliminating the need for consideration of looping constructs in the build process.

30 Claims, 6 Drawing Sheets

AUTOMATIC BATCHING OF TASKS IN A BUILD PROCESS

FIELD OF THE INVENTION

The invention relates generally to software development and in particular to automatically batching tasks in a build process.

BACKGROUND OF THE INVENTION

Throughout software development, application components are collected and compiled for testing and debugging purposes. The compilation of all the components of the software product into a version of the program is called a build. Typically, reiterative builds are required in the development process. Build engines, whether stand-alone or incorporated into a design environment, are typically black boxes into which source code is fed and binaries or assemblies are emitted. As programming becomes more sophisticated, the demand for programming tools has increased. This has led to incorporation of design tools and build engine into an integrated design environment. This practice presents new problems. For example, it can be difficult to map a complicated build infrastructure into an integrated design environment. Problems typically center around the inability to fully customize or understand what happens when a project is built within the development environment; the inability to reproduce a build within a build lab environment where the integrated design environment is not likely to be present; and the limitations of a build system that is optimized to model single projects rather than entire products.

SUMMARY OF THE INVENTION

A build mechanism enables the generic creation of build rules comprising one or more build tasks. Re-useable build tasks are analyzed and tasks with identical scalar values are batched together, eliminating the need for consideration of looping constructs in the build process. A build task consumes one or more items, and may transforming one or more items from one type to a second type. Each of the items may be associated with one or more scalar values, each scalar value representing an attribute or attribute value. Buckets may be generated, grouping items having the same scalar value for the attribute together. The task may be executed once for each bucket generated.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

A build process can be customized, augmented or redefined via the use of a documented file format that is defined and validated by a schema. In some embodiments of the invention, the file is an XML file supported by an XML schema definition. The build process can be integrated easily into an integrated design environment.

The way that the build process processes and builds software is transparent. In some embodiments of the invention, the build tasks comprising the build process may be generically expressed in an XML project file and can be reused. The XML project file can be authored by a human or generated automatically by an integrated design environment. Any part of the build process can be understood, replicated, edited, removed, or augmented. A build operation or target is expressed generically so that it will run regardless of the inputs supplied. A target may include a number of tasks. Build Tasks receive arrays of files called items and metadata associated with the items. Build Tasks are analyzed and inputs having identical scalar values are placed in separate buckets and the appropriate build task is run once for each bucket generated.

Exemplary Computing Environment

Figure 1:
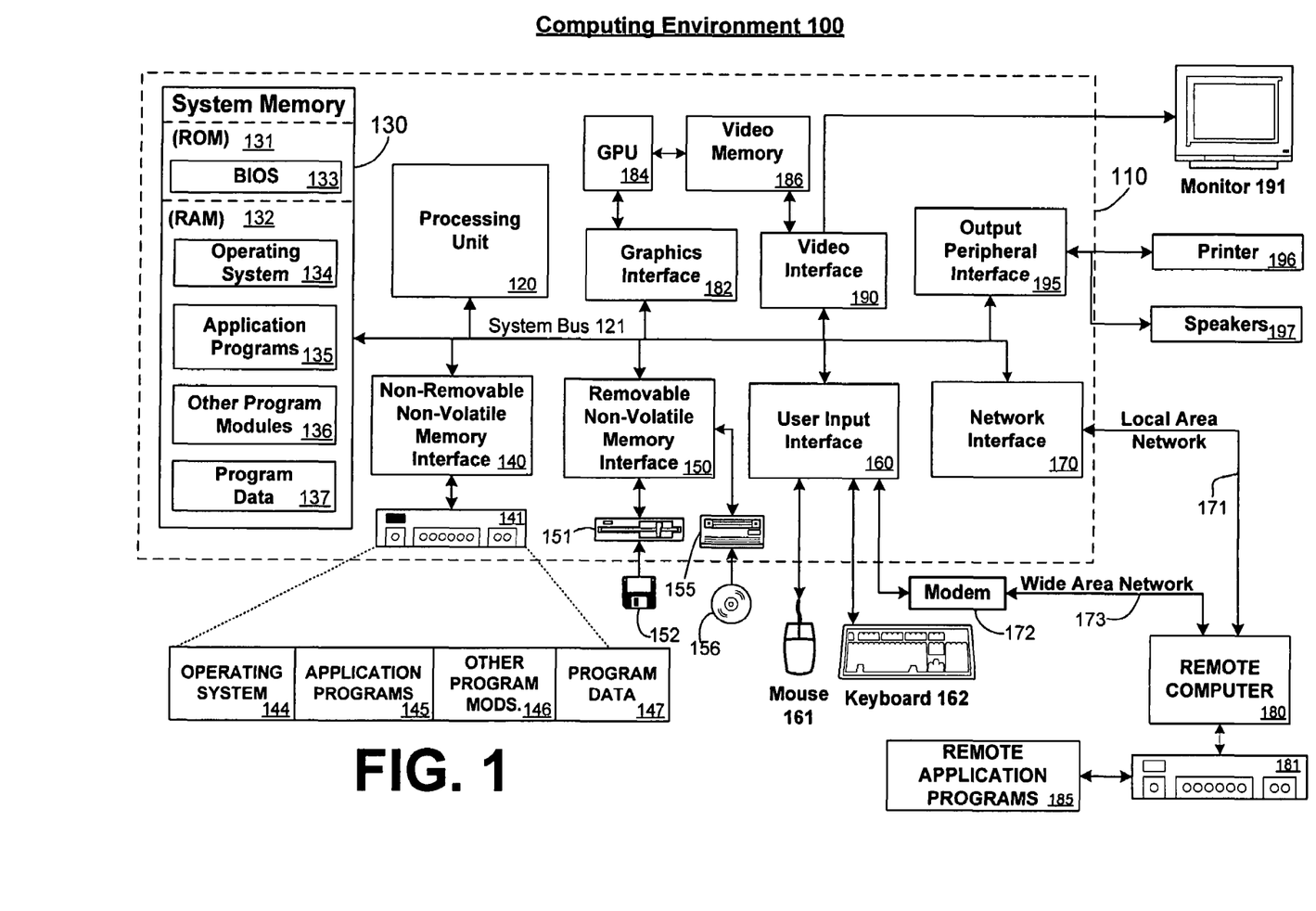
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Automatic Batching of Build Tasks

Figure 2:
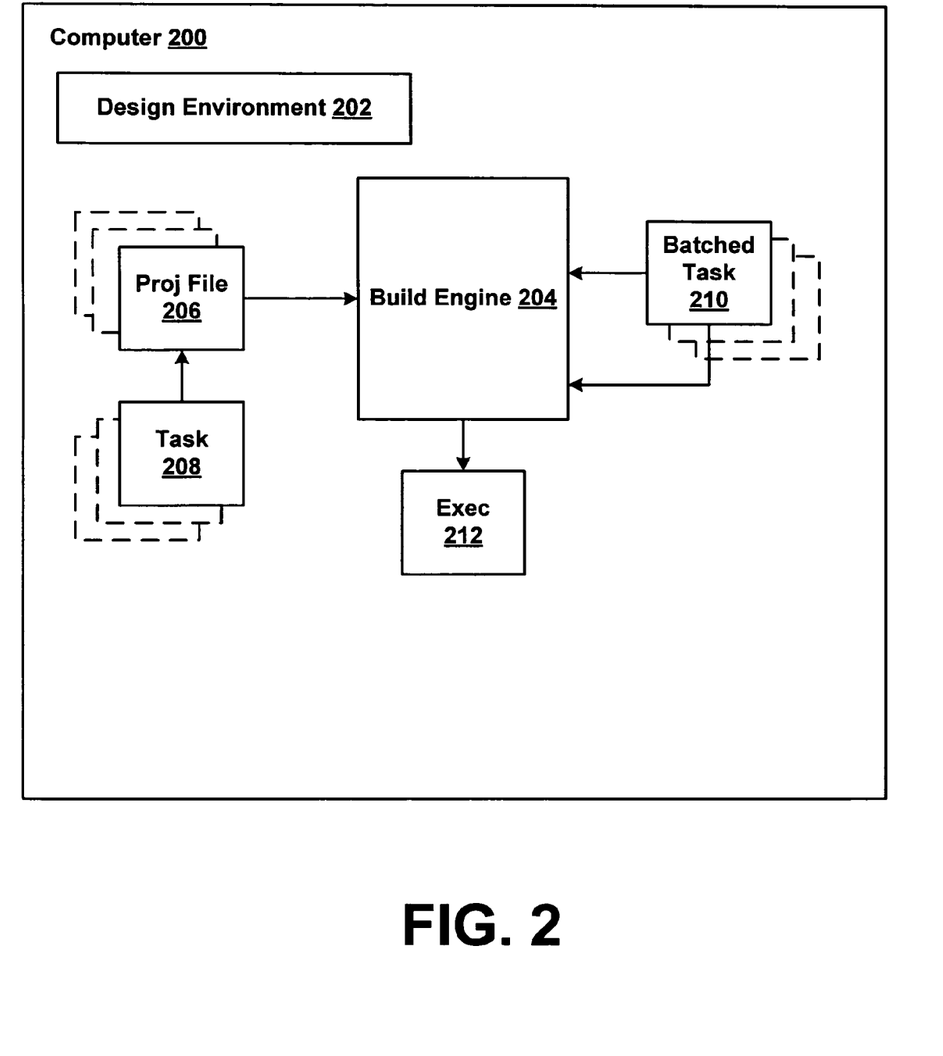
FIG. 2 is a block diagram of an exemplary system for batching build tasks in accordance with one embodiment of the invention.

FIG. 2 illustrates an exemplary system for automatically batching build tasks based on scalars (metadata) in accordance with one embodiment of the invention. Referring now to FIG. 2, computer 200 represents a computer, such as computer 110 described with respect to FIG. 1, on which the invention may reside. Design environment 202, such as for example, Microsoft®'s Visual Studio®, Borland® C# Builder, SharpDevelop, Antechinus, CodeWright®, SourceInsight, Eclipse, Dreamweaver by Macromedia or Borland® C++ Builder® Studio 6, etc. may also reside on computer 202. The design environment may be designed to run on a virtual machine such as Sun Microsystem®'s JAVA®, Microsoft®'s.NET®, etc., or may run on a conventional machine. The system for automatically batching build tasks may be standalone, incorporated within the design environment, or both.

Build engine 204 in some embodiments of the invention receives one or more project files (such as exemplary project file 206) and generates therefrom, executable code 212. In some embodiments of the invention, a project file comprises an XML-based file that enables the description of what product(s) (artifacts) need to be built, as well as how they need to be built under different configurations. One or more re-useable custom build rules may be specified to be used with the project. Re-useable custom build rules enable builds to be done consistently across different projects within a product.

A build is composed of one or more build operations, or steps in the build. A logical step in the build process is called a Target. A Target executes one or more tasks in order to perform the desired operation. An exemplary XML Target statement is shown below:

```
<Target Name="CopyToServer"
    Inputs="$(OutputDir)\HelloWorld.exe"
    Outputs="\\DeployServer\$(BuildNum)\HelloWorld.exe"
    DependsOnTargets="Compile">
    <Copy.../>
</Target>
```

Figure 4:
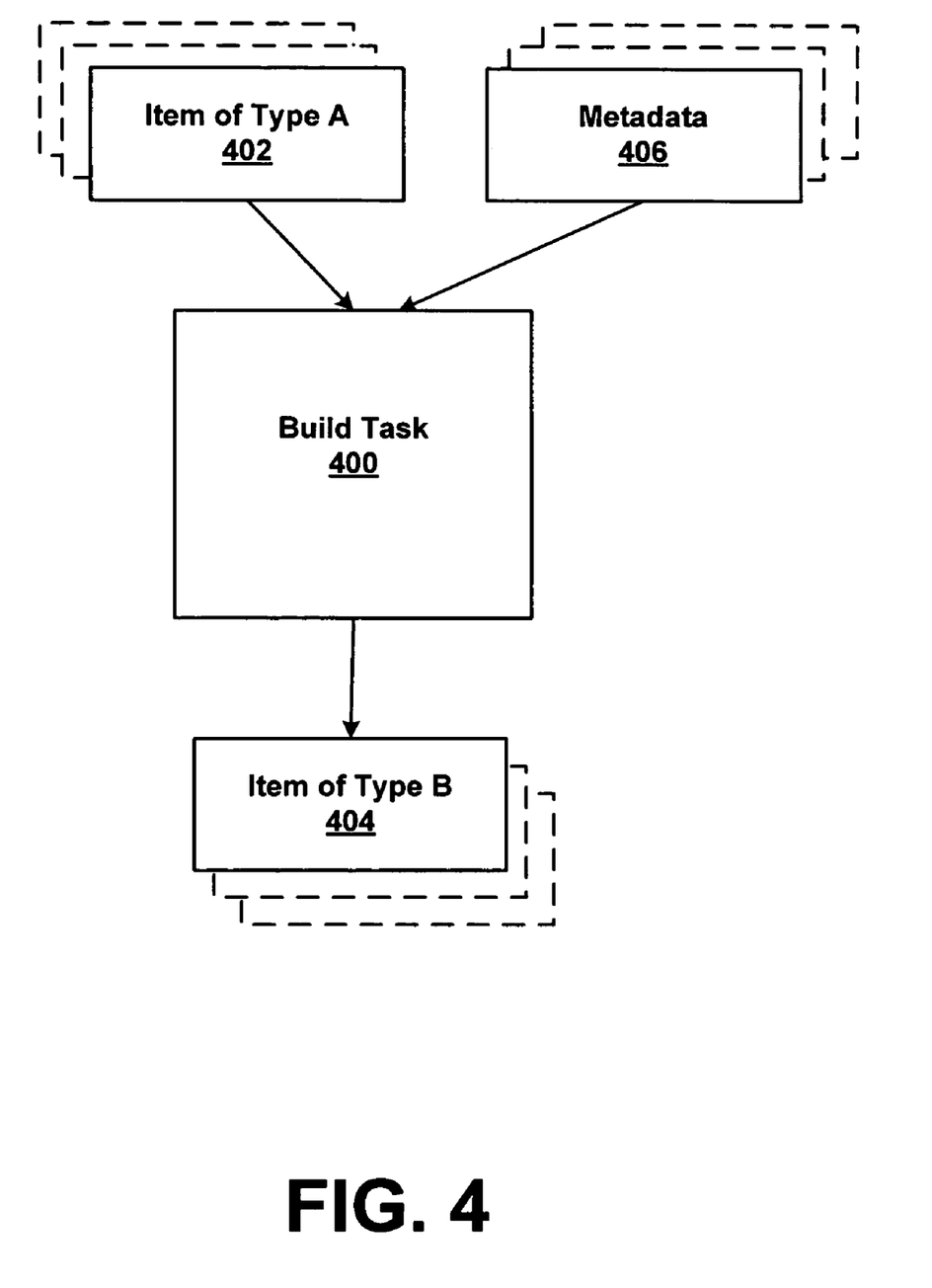
FIG. 4 is a block diagram of an exemplary re-useable build task in accordance with one aspect of the invention.

A Task is an atomic unit in the build operation. FIG. 4 is a block diagram illustrating a Build Task 400 and its inputs and outputs. A Task may consume one or more Items 402, etc. A task may also emit one or more Items 404 that another Task may consume. The build operation performed when task 400 is executed, transforms items of type a 402 into items of type b 404 using input parameters 406. A Task can accept input parameters from Property elements, Item elements, or plain strings, represented in FIG. 4 as Metadata 406, etc.

The Name of a Task identifies the build data type required to perform the Task. For example, the Task with a Name of Csc may invoke a C# compiler as the build tool. The compiler may compile all Item elements specified in the Sources attribute (which, for example, may specify Item elements with a Type of "Compile") into an assembly, and may produce the assembly as an output Item. The following is an exemplary XML statement accomplishing the above:

```
<Csc AssemblyName="$(OutputDir)\HelloWorld.exe"
    Sources="@(Compile)" />
```

Hence a build task may transform C# sources (402) into assemblies (404), resource generation files (402) into resources (404), XAML files (402) into C# sources (404), and so on.

Figure 5:
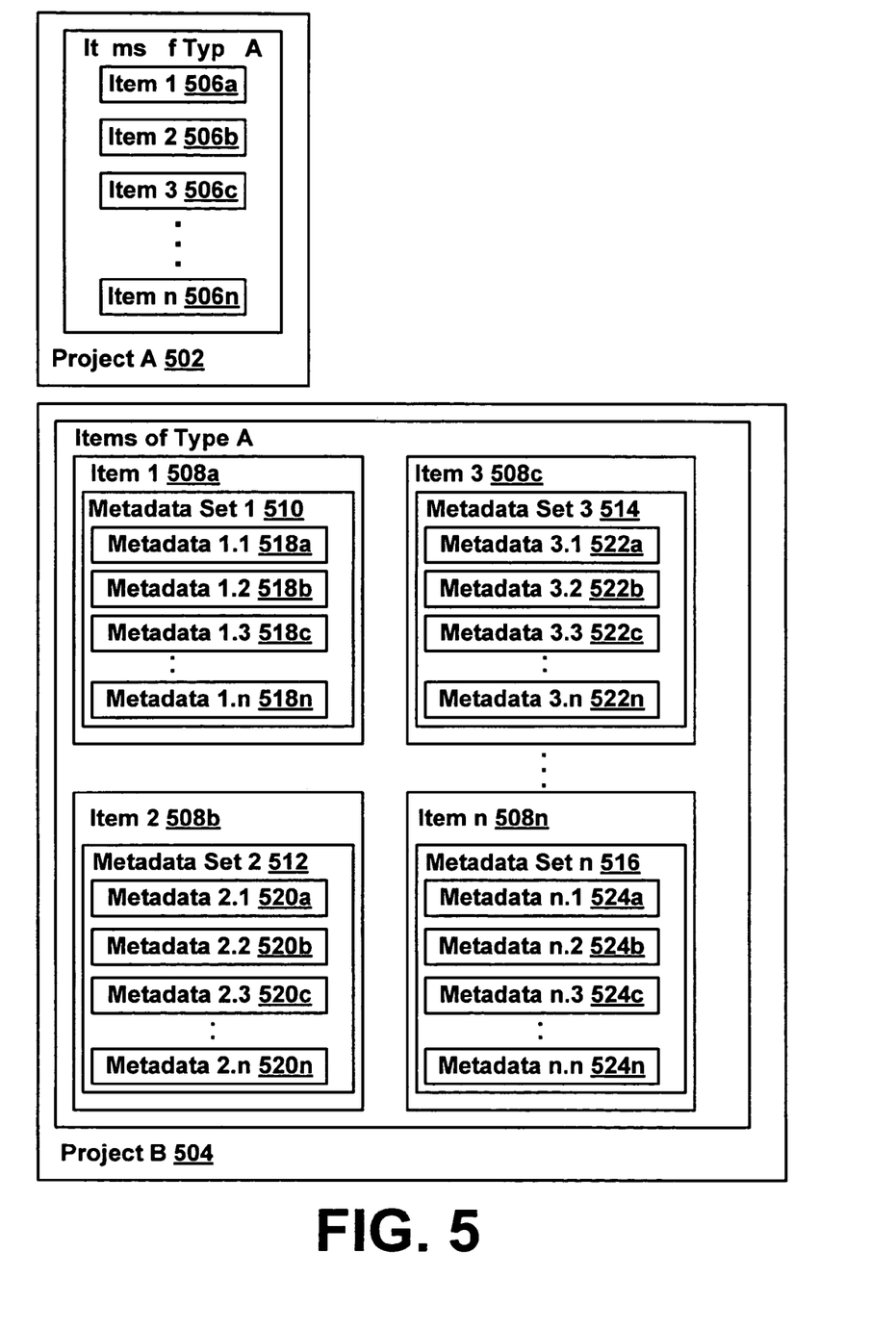
FIG. 5 is a block diagram of projects including Items in accordance with one aspect of the invention.

An Item may be considered an array of files. FIG. 5 illustrates exemplary Items of type A, as defined in two projects, project A 502 and project B 504. Exemplary Items A of project A includes n Items, Item 1 (506a), Item 2 (506b), Item 3 (506c), etc. to Item n (506n). Exemplary Items 1 . . . n of project A are not associated with any metadata.

Exemplary Items of Type A of project B, Item 1 (508a), Item 2 (508b), Item 3 (508c) etc. to Item n (508n) of project B are associated with metadata, that is, exemplary Metadata Set 1 510 is associated with Item 1 508a, Metadata Set 2 512 is associated with Item 2 508b, Metadata Set 3, 514 is associated with Item 3 508c etc. to Metadata Set n, 516, associated with Item n 508n. In some embodiments of the invention, targets and tasks may be batched based on the metadata values of item-level attributes. That is, the items may be placed into buckets based on their attribute or metadata values, (scalar, metadata) and the target or task invoked once for each bucket. Hence, bucket 1 may include Metadata 1.1 518*a*, Metadata 1.2 518*b*, Metadata 1.3 518*c*, etc. to Metadata 1.*n* 518*n*, bucket 2 may include Metadata 2.1 520*a*, Metadata 2.2 520*b*, Metadata 2.3 520*c*, etc. to Metadata 2.*n* 520*n*, bucket 3 may include Metadata 3.1 522*a*, Metadata 3.2 522*b*, Metadata 3.3 522*c*, etc. to Metadata 3.*n* 522*n* and so on to bucket n which may include Metadata n.1 524*a*, Metadata 2 524*b*, Metadata n.3 524*c*, etc. to Metadata n.n 524*n*. Hence, batching may be controlled by the item-level attributes chosen to be referenced in the <Task> element.

For example, suppose the metadata set (Metadata Set 1 510) for item 1 508*a* includes the following information: Metadata 1.1 518*a*, (output assembly name=foobar), Metadata 1.2 518*b* (final assembly name=foobar.exe) and Metadata 1.3 518*c* (optimizetrue); the metadata set (Metadata Set 2 512) for item 2 508*b* includes: Metadata 2.1 520*a*, (output assembly name=foobar), Metadata 2.2 520*b* (final assembly name=foobar.exe) and Metadata 2.3 520*c* (optimize=true), and the metadata set (Metadata Set 3 514) for item 3 508*c* includes: Metadata 3.1 522*a*, (output assembly name=foobar), Metadata 3.2 522*b* (final assembly name=foobar.exe) and Metadata 3.3 520*c* (optimize=false). In some embodiments of the invention, Metadata Set 1 510 (output assembly name=foobar, final assembly name=foobar.exe, optimize=true) Metadata Set 2, 512 (output assembly name=foobar, final assembly name=foobar.exe, optimize=true) and Metadata Set 3 (output assembly name=foobar, final assembly name=foobar.exe, optimize=false) are analyzed. Items 1 and 2 (508*a* and 508*b*) may be placed in the same bucket because Metadata Set 1 is identical to Metadata Set 2, while item 3 is placed in another bucket because Metadata Set 3 is unequal to the metadata set (output assembly name=foobar, final assembly name=foobar.exe, optimize=true) associated with the first bucket. An individual attribute value (e.g., "optimize=false") associated with an item (e.g., item 3) may be a scalar value while the set of all the attibute values ("output assembly name=foobar, final assembly name=foobar.exe, optimize=false") associated with an item (e.g., item 3) may be referred to as the item identity.

Figure 6:
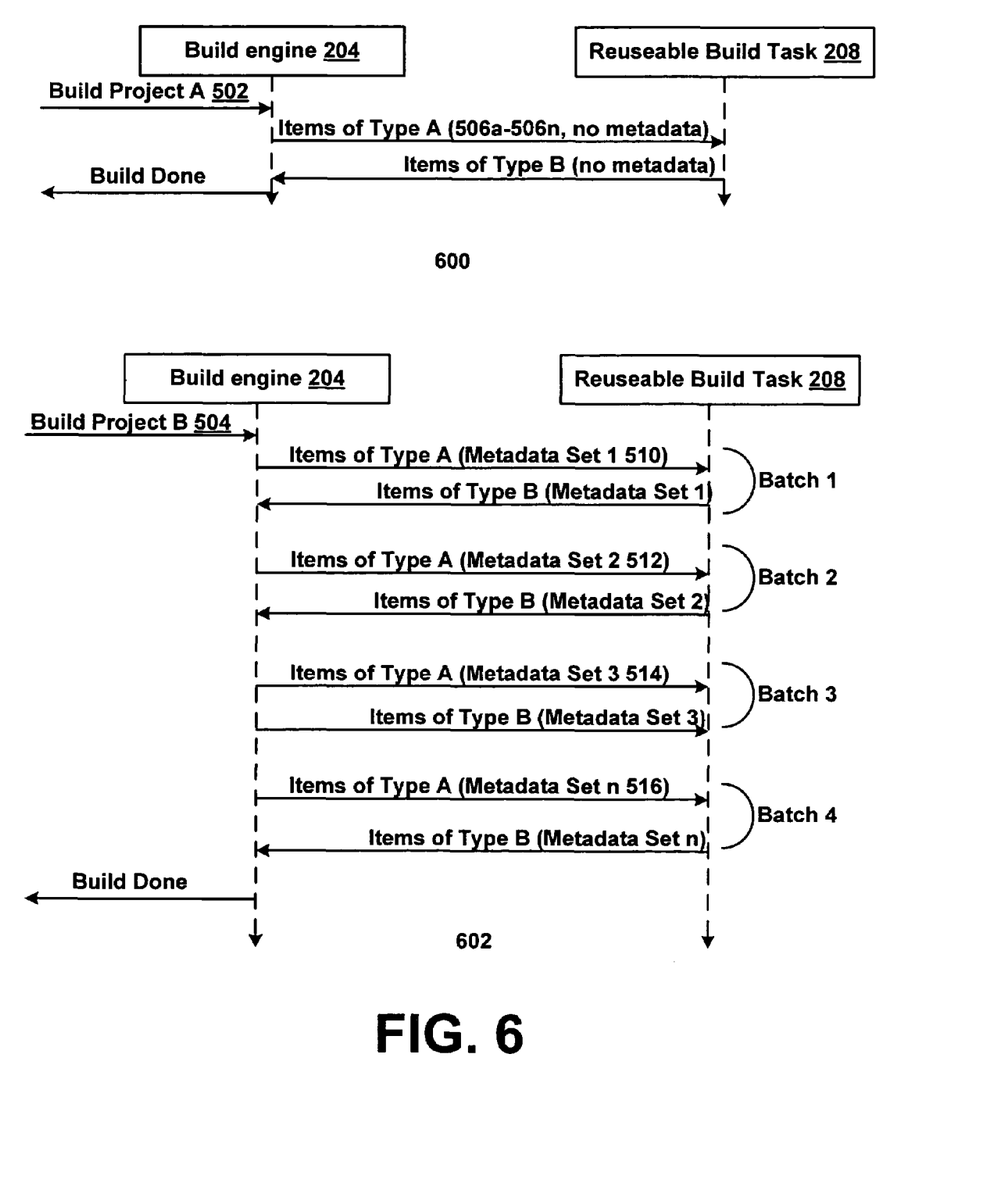
FIG. 6 is a sequence diagram of a build process in accordance with one embodiment of the invention.

FIG. 6 shows a sequence diagram of an exemplary build process in accordance with some embodiments of the invention for Project A (600) and Project B (602). The build process 600 receives items of type A (with no metadata), such as exemplary items 506*a-n* and returns items of type B (with no metadata). The build process 602 thus may receive n batches of items of type A, one batch for each of the metadata sets 1 to n and return n batches of items of type B, one batch for each metadata set 1 to n.

An Item can contain wildcards and can exclude specific files. In some embodiments of the invention, the Type attribute of an Item is used to categorize items, as shown below:

```
<ItemGroup>
    <Compile Include="*.cs" Exclude="DebugStuff.cs" />
</ItemGroup>
```

An Item may have one or more item-level attributes. An item-level attribute may be declared as a child element of the <Item> tag. For example,

```
<ItemGroup>
    <Reference Include="System.dll">
        <HintPath="c:\Whidbey\1.2.30627.00" />
    </Reference>
</ItemGroup>
``` hence "Condition"s may be placed on item-level attributes, (necessary for some C++ scenarios, for example). A Condition attribute is roughly equivalent to a simple if statement. In some embodiments of the invention, a Condition, for example, can compare two strings or check for the existence of a file or directory.

Each Item, in some embodiments of the invention, may automatically receive a set of predefined Item-level attributes. These attributes may exist on every item. The values of the Item may be set by build engine 204, even though the value is not explicitly declared beneath the <Item> tag. Predefined Item-level attributes may include any combination of the following:

Extension
Filename
FullPath
Directory
Drive
RecursivePortion
RelativePath
Identity
ModifiedTime
CreatedTime
AccessedTime In some embodiments, Item-level attributes may be referenced in the project file in a way similar to the way properties are referenced. In some embodiments, a percent sign, (%), may be used instead of a dollar sign, ($), to reference an Item-level attribute. The %(AttributeName) syntax may be considered a "scalar" value, meaning that it evaluates to a single string, not a list/array of strings, in contrast to an item list referenced using @(itemtype) syntax, which is a vector, and resolves to a list or an array.

In some embodiments of the invention, item-level attributes can be referenced using the %(AttributeName) syntax anywhere within the <Task> element, in the "Inputs" and "Outputs" attributes of the <Target> element, and as part of an item transformation anywhere in the project file—for example, @(ResX→"%(Filename).resources"). Alternatively, item-level attributes may be so referenced anywhere in the project file.

In some embodiments of the invention, targets and tasks may be batched based on item-level attribute values. All the items are placed into buckets based on their attribute values, (scalar, metadata) and the target or task is invoked once for each bucket. Hence, batching is controlled by the item-level attributes chosen to be referenced in the <Task> element.

When the same attribute name exists on more than one item list (as is the case with predefined attributes), the item list referenced may be specified using, for example, the %(ItemType.AttributeName) syntax or if unambiguous, the %(AttributeName) syntax may be used.

An item attribute may in some embodiments continue to travel with the item itself when the item is passed to a task.

A "Condition" may be placed on an <Attribute> element, the condition referencing previously defined properties and item lists.

Figure 3:
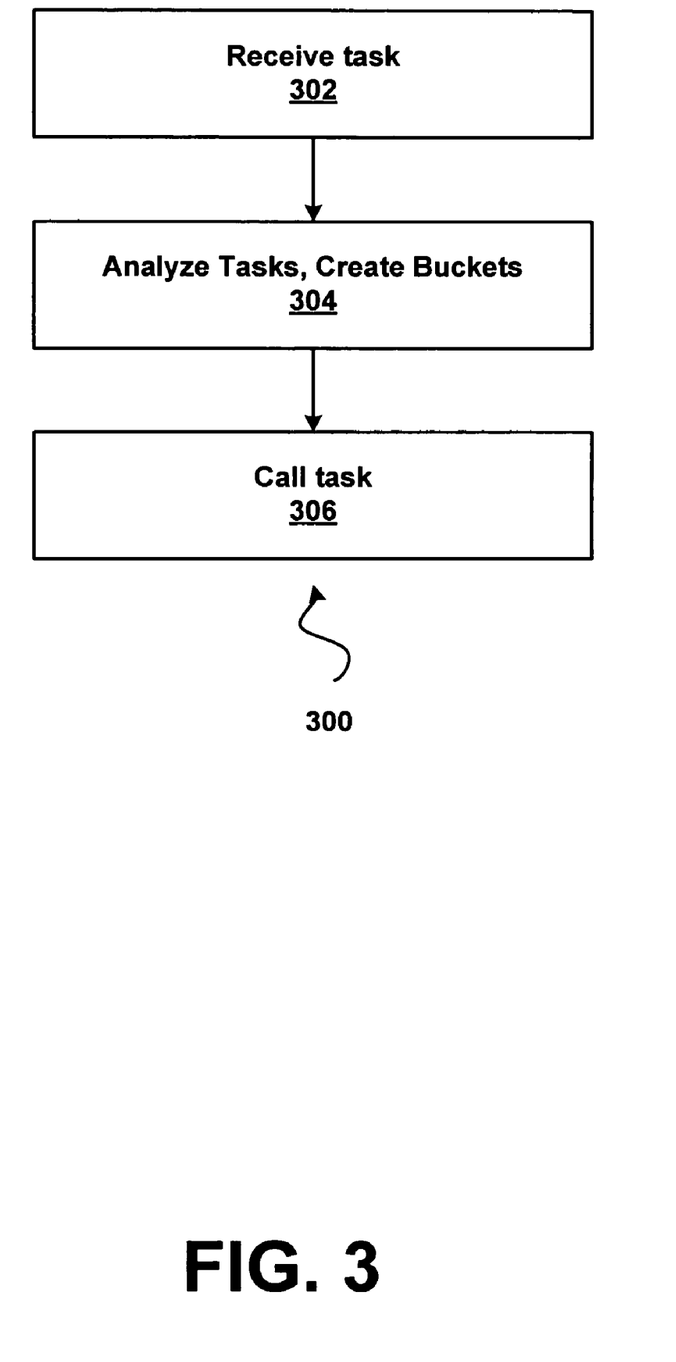
FIG. 3 is a flow diagram of an exemplary method for batching build tasks in accordance with one embodiment of the invention.

FIG. 3 is a flow diagram of a method 300 for batching build tasks based on scalar values in accordance with some embodiments of the invention. At step 302 a task input is received. The task is analyzed, and bucketized based on attribute value (step 304) and at step 306, the task is called. Step 306 may be repeated, (e.g., once for each bucket generated). Method 300 may be repeated for each build task in the project file. Batching may be used to build satellite assemblies, to build multiple assemblies, to invoke an executable once per entry in a list, to filter a list of items based on an item-level attribute, to execute a task based on a number of different attributes for a single task element, to execute a task based on a group of items, and to process only batches that are out-of-date.

Batching may be used to automatically (programmatically) build satellite assemblies, as shown in the following example:

```
<Project>
    <ItemGroup>
        <Res Include="Strings.fr.resources">
            <Culture="fr"/>
        </Res>
        <Res Include="Strings.en.resources">
            <Culture="en"/>
        </Res>
        <Res Include="Strings.jp.resources">
            <Culture="jp"/>
        </Res>
        <Res Include="Dialogs.en.resources">
            <Culture="en"/>
        </Res>
        <Res Include="Dialogs.fr.resources">
            <Culture="fr"/>
        </Res>
        <Res Include="Menus.fr.resources">
            <Culture="fr"/>
        </Res>
        <Res Include="Menus.jp.resources">
            <Culture="jp"/>
        </Res>
    </ItemGroup>
    <Target Name="Build" >
        <AL
            Resources="@(Res) "
            TargetType="library"
            OutputAssembly="%(Culture)\MyApp.resources.dll"
        />
    </Target>
</Project>
```

In this example, "Culture" may be a user-defined attribute on the items. Because an item-level attribute is being referenced in the <Task> element, batching is invoked. In this case, all the "Res" items are placed into separate buckets based on their "Culture" attributes, and the "AL" (ALink) task is invoked three times as follows:

1. AL
   Resources="Strings.fr.resources; Dialogs.fr.resources; Menus.fr.resources"
   TargetType="library"
   OutputAssembly="fr\MyApp.resources.dll"
2. AL
   Resources="Strings.en.resources; Dialogs.en.resources"
   TargetType="library"
   OutputAssembly="en\MyApp.resources.dll"
3. AL
   Resources="Strings.jp.resources; Menus.jp.resources"
   TargetType="library"
   OutputAssembly="jp\MyApp.resources.dll"

Batching may be used to automatically (programmatically) build multiple assemblies as shown in the following example. In the example below, multiple item lists are batched together (CS and Ref). It will be noted that the same attribute exists on multiple item lists.

```
<Project>
    <ItemGroup>
        <Attribute Assembly="MainApp">
        <CS Include="a.cs"/>
        <CS Include="b.cs"/>
        <CS Include="c.cs"/>
        <Ref Include="System.dll"/>
        <Ref Include="System.Xml.dll"/>
    </ItemGroup>
    <ItemGroup>
        <Attribute Assembly="HelperApp">
        <CS Include="d.cs">
        <CS Include="e.cs"/>
        <CS Include="f.cs"/>
        <Ref Include="System.dll"/>
        <Ref Include="System.Forms.dll"/>
    </ItemGroup>
    <ItemGroup>
        <AdditionalLibPath Include="c:\homer\libs" />
        <AdditionalLibPath Include="c:\marge\libs" />
        <AdditionalLibPath Include="c:\lisa\libs" />
    </ItemGroup>
    <Target Name="Build" >
        <Csc
            Sources="@(CS) "
            References="@(Ref) "
            OutputAssembly="%(Assembly) "
            TargetType="library"
            AdditionalLibPaths="@(AdditionalLibPath) "
        />
    </Target>
</Project>
```

In this example, a shorthand notation, putting the <Attribute> at the ItemGroup level instead of repeating the same <Attribute> beneath all the individual <Item>s has been used, although either is equivalent.

Each of the items in the three item lists: CS, Ref, and AdditionalLibPath have an attribute called "Assembly" which is referenced by the <Task> element. In some embodiments of the invention, the item lists are split into multiple buckets. Because the items in the "AdditionalLibPath" list do not have the "Assembly" attribute set, these items will be passed in for every batch. The result is that the "Csc" task will be invoked twice as follows:

1. Csc
   Sources="a.cs; b.cs; c.cs"
   References="System.dll; System.Xml.dll"
   OutputAssembly="MainApp"
   TargetType="library"
   AdditionalLibPaths="c:\homer\libs; c:\marge\libs; c:\lisa\libs"
2. Csc
   Sources="d.cs; e.cs; f.cs"
   References="System.dll; System.Forms.dll"
   OutputAssembly="HelperApp"
   TargetType="library"
   AdditionalLibPaths="c:\homer\libs; c:\marge\libs; c:\lisa\libs"

Note that the lack of an attribute being set on an item is not the same as the attribute being set to <blank>.

Batching may be used to automatically (programmatically) execute one item at a time. Some executables can only handle one file/item at a time. In order to invoke the executable once per entry in a list, in the following example:

```
<Project>
    <ItemGroup>
        <VSProj Include="*.csproj;*.vbproj" />
    </ItemGroup>
    <Target Name="Build">
        <Exec
            Command="devenv.exe %(VSProj.FullPath)"
        />
    </Target>
</Project>
``` the "FullPath" an item-level attribute but instead of being explicitly set beneath the <Item> tag, it is automatically set on every item by the build engine. Also, in this example, the attribute with the item type must be specified by saying "VSProj.FullPath", because otherwise it is not clear which item list the task is referring to.

The result of the above project is that "devenv.exe <ProjectFile>" is invoked once for each .CSPROJ and .VBPROJ file in the current directory, because each item in the "VSProj" list has a different value for the "FullPath" attribute.

Batching may be used to automatically (programmatically) filter an Item list Bbased on attribute values. "Condition" on the <Task> element can be used to effectively filter a list of items based on one of the item-level attributes, as illustrated in the following example:

```
<Project>
    <ItemGroup>
        <CS Include="a.cs">
            <Generated>false</Generated>
        </CS>
        <CS Include="b.cs">
            <Generated>false</Generated>
        </CS>
        <CS Include="c.cs">
            <Generated>false</Generated>
        </CS>
        <CS Include="d_gen.cs">
            <Generated>true</Generated>
        </CS>
        <CS Include="e_gen.cs">
            <Generated>true</Generated>
        </CS>
        <CS Include="f_gen.cs">
            <Generated>true</Generated>
        </CS>
    </ItemGroup>
    <Target Name="CopyGeneratedFiles" >
        <Copy
            SourceFiles="@(CS) "
            Destination="obj\generated_files\"
            Condition=" '%(Generated) ' == 'true' "
        />
    </Target>
</Project>
```

Because the "Generated" attribute is being referenced, in some embodiments the "CS" items are bucketed according to their value for this attribute. Two buckets are generated, one where Generated="false" and one where Generated="true". Because the condition for the first bucket is false, the Copy task for this bucket is skipped. Because the condition for the second bucket is true, the Copy task for the second bucket is performed. It will be apparent that the same batching logic accomplishes filtering. In the example above, d_gen.cs, e_gen.cs, and f_gen.cs are copied to the obj\generated_files subdirectory.

Because "Extension" is a predefined attribute on every item, an item can be filtered based on the file extension. Alternatively items can be separated into different item lists if the items are to be treated differently by the build process.

Batching can be used to reference multiple attributes in the same task. By determining the union of all of the referenced attributes, multiple attributes can be used to determine which bucket to place items in. For example, in the following example:

```
<Project>
    <ItemGroup>
        <CS Include="a.cs">
            <Config="Debug" />
            <Assembly="MainApp" />
        </CS>
        <CS Include="b.cs">
            <Config="Release" />
            <Assembly="Helper" />
        </CS>
        <CS Include="c.cs">
            <Config="Ship" />
            <Assembly="MainApp" />
        </CS>
        <CS Include="d.cs">
            <Config="Checked" />
            <Assembly="Helper" />
        </CS>
        <CS Include="e.cs">
            <Config="Debug" />
            <Assembly="MainApp" />
        </CS>
        <CS Include="f.cs">
            <Config="Release" />
            <Assembly="Helper" />
        </CS>
        <CS Include="g.cs">
            <Config="Debug" />
            <Assembly="Helper" />
        </CS>
        <CS Include="h.cs">
            <Config="Release" />
            <Assembly="Helper" />
        </CS>
    </ItemGroup>
    <Target Name="Build" >
        <Csc
            Sources="@(CS) "
            OutputAssembly="bin\%(Config)\%(Assembly).dll"
            TargetType="library"
        />
    </Target>
</Project>
```

In some embodiments of the invention, the build engine determines that there are two attributes being passed into the task—Config and Assembly. The items are bucketed, taking into consideration the values of both of these attributes. The following buckets may be generated:

Bucket 1: a.cs; e.cs (Debug, MainApp)
Bucket 2: b.cs; f.cs; h.cs (Release, Helper)
Bucket 3: c.cs (Ship, MainApp)
Bucket 4: d.cs (Checked, Helper)
Bucket 5: g.cs (Debug, Helper)
Hence, the "Csc" task would be invoked five times.
Batching may be determined via Attributes on a group of items (e.g., <ItemGroup>).

When attributes are placed on the <ItemGroup> tag, they are automatically inherited by all child items, unless overridden, as shown in the following example:

```
<Project>
    <ItemGroup>
        <Attribute Culture=""/>
        <ItemGroup>
            <Attribute Culture="FR"/>
            <Res Include="Strings1.resources" />
            <Res Include="Strings2.resources" />
            <Res Include="Strings3.resources">
                <Attribute Culture="fr-fr"/>
            </Res>
        </ItemGroup>
        <Res Include="Strings4.resources" />
        <Res Include="Strings5.resources" >
            <Attribute Culture="jp" />
        </Res>
    </ItemGroup>
</Project>
```

The above project, produces equivalent results as:

```
<Project>
    <Res Include="Strings1.resources">
        <Attribute Culture="FR"/>
    </Res>
    <Res Include="Strings2.resources">
        <Attribute Culture="FR"/>
    </Res>
    <Res Include="Strings3.resources">
        <Attribute Culture="fr-fr"/>
    </Res>
    <Res Include="Strings4.resources">
        <Attribute Culture=""/>
    </Res>
    <Res Include="Strings5.resources">
        <Attribute Culture="jp"/>
    </Res>
</Project>
```

Batching may be performed at the target level. In some embodiments of the invention, bucketing at the <Target> element is where timestamp checking occurs. In some embodiments a list of items is broken up into separate batches, each batch producing a single output. Timestamp checking is performed such that only the batches that are out-of-date are processed. For example, considering the following example:

```
<Project>
    <ItemGroup>
        <Res Include="Strings.fr.resources">
            <Culture="fr"/>
        </Res>
        <Res Include="Strings.en.resources">
            <Culture="en"/>
        </Res>
        <Res Include="Strings.jp.resources">
            <Culture="jp"/>
        </Res>
        <Res Include="Dialogs.en.resources">
            <Culture="en"/>
        </Res>
        <Res Include="Dialogs.fr.resources">
            <Culture="fr"/>
        </Res>
        <Res Include="Menus.fr.resources">
            <Culture="fr"/>
```
-continued
```
        </Res>
        <Res Include="Menus.jp.resources">
            <Culture="jp"/>
        </Res>
    <ItemGroup>
    <Target Name="Build">
        <AL
            Resources="@(Res)"
            TargetType="library"
            OutputAssembly="%(Culture)\MyApp.resources.dll"
        />
    <Target>
</Project>
``` the following three assemblies:
fr\MyApp.resources.dll
en\MyApp.resources.dll
jp\MyApp.resources.dll
are produced. To avoid always building all three assemblies every time, even if none of the .resources files have been modified on disk, "Inputs" and "Outputs" may be added to the <Target> element, so that the build engine of the present invention can do incremental builds intelligently and efficiently. For example, given the following:

```
<Project>
    <ItemGroup>
        <Res Include="Strings.fr.resources">
            <Culture="fr"/>
        </Res>
        <Res Include="Strings.en.resources">
            <Culture="en"/>
        </Res>
        <Res Include="Strings.jp.resources">
            <Culture="jp"/>
        </Res>
        <Res Include="Dialogs.en.resources">
            <Culture="en"/>
        </Res>
        <Res Include="Dialogs.fr.resources">
            <Culture="fr"/>
        </Res>
        <Res Include="Menus.fr.resources">
            <Culture="fr"/>
        </Res>
        <Res Include="Menus.jp.resources">
            <Culture="jp"/>
        </Res>
    </ItemGroup>
    <Target Name="Build"
        Inputs="@(Res)"
        Outputs="%(Culture)\MyApp.resources.dll"
    <
        <AL
            Resources="@(Res)"
            TargetType="library"
            OutputAssembly="%(Culture)\MyApp.resources.dll"
        />
    </Target>
<Project>
```

The item lists referenced in the <Target> element are examined, and the item attributes referenced in the <Target> element are determined. Items are placed into buckets according to their attribute values. The target is executed multiple times, once for each bucket. For each execution of the target, the tasks within that target are visible only to the items that are part of that target-level bucket.

In the above example, the target is executed three times as follows:

```
1.  <Target Name="Build"
      Inputs="Strings.fr.resources;
        Dialogs.fr.resources;
        Menus.fr.resources"
      Outputs="fr\MyApp.resources.dll"
      >
      <AL
        Resources="Strings. fr.resources;
          Dialogs.fr.resources;
          Menus. fr.resources"
        TargetType="library"
        OutputAssembly="fr\MyApp.resources.dll"
      />
    <Target>
2.  <Target Name="Build"
      Inputs="Strings.en.resources;
        Dialogs.en.resources"
      Outputs="en\MyApp.resources.dll"
      >
      <AL
        Resources="Strings.en.resources;
          Dialogs.en.resources"
        TargetType="library"
        OutputAssembly="en\MyApp.resources.dll"
      />
    <Target>
3.  <Target Name="Build"
      Inputs="Strings.jp.resources;
        Menus.jp.resources"
      Outputs="jp\MyApp.resources.dll"
      >
      <AL
        Resources="Strings.jp.resources;
          Menus.jp.resources"
        TargetType="library"
        OutputAssembly="jp\MyApp.resources.dll"
      />
    <Target>
```

Thus, a satellite assembly will only be rebuilt if one or more of the resources files that go into that satellite assembly are newer than the satellite assembly itself.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Similarly it will be understood that although the batching of tasks is described within the context of an automated way of building software products, the invention is not so limited and may be used wherever the automatic batching of tasks is useful, as for example in the context of business processes. Therefore, the present invention should not be limited to any single embodiment, but rather should be construed in breadth and scope in accordance with the appended claims.

What is claimed:

1. A computer system having computer instruction modules for batching tasks in a build process, the modules comprising:

a project file comprising at least one task, the at least one task for consuming a plurality of items, each of the plurality of items associated with a value representing a set of attributes; and a build engine that receives the project file and generates executable code from the project file, the build engine grouping into buckets the plurality of items of the task of the project file based on the value representing the set of attributes for each item, each bucket representing a particular value and containing at least one of a plurality of the items of the task having the represented value, and the build engine executing the task once for each bucket thereof.

2. The system of claim 1, wherein the value representing the set of attributes comprises an identity of the item.

3. The system of claim 1, wherein the set of attributes comprises at least one attribute of a plurality of attributes, the at least one attribute associated with a scalar.

4. The system of claim 2, wherein the build engine batches the plurality of items based on the identity associated with each of the plurality of items, generating a separate batch for each unequal identity.

5. The system of claim 4, wherein the at least one task is executed once for each generated batch.

6. A method for batching build tasks comprising:

receiving a project file comprising at least one build task, the at least one build task consuming task input, the task input comprising a plurality of items, each of the plurality of items associated with an identity comprising a value for a set of attributes;

analyzing the task input to generate at least a first bucket for items of the build task associated with a first identity and a second bucket for items of the build task associated with a second identity such that each of the first and second buckets represents a particular identity and contains at least one of a plurality of the items of the build task having the represented identity, wherein the first identity and the second identity are unequal; and executing the build task once for the first generated bucket and once for the second generated bucket.

7. The method of claim 6, wherein a plurality of satellite assemblies are automatically generated.

8. The method of claim 6, wherein a plurality of assemblies are automatically generated.

9. The method of claim 6, wherein an executable is automatically invoked once for each entry in a list.

10. The method of claim 6, wherein the plurality of items is filtered based on an attribute.

11. The method of claim 6, wherein the plurality of items is filtered based on a plurality of attributes.

12. The method of claim 6, wherein only out-of-date batches are processed as determined based on timestamp checking of each item.

13. The method of claim 6, wherein the at least one item is of a first type.

14. The method of claim 13, wherein executing the build task transforms the at least one item of the first type to an item of a second type.

15. The method of claim 6, wherein the identity comprises at least one scalar of a plurality of scalars, the at least one scalar comprising a value for one attribute.

16. The method of claim 15, wherein the attribute value may be pre-defined.

17. The method of claim 16, wherein the attribute value may be declared.

18. A method for batching build tasks comprising:
receiving a project file comprising at least one build task, the at least one build task consuming a plurality of items, each of the plurality of items associated with an identity comprising a value for a set of attributes;
grouping items of the build task having a first particular identity into a first bucket such that the first bucket represents the first particular identity and contains at least one of a plurality of the items of the build task having the represented first identity;
grouping items of the build task having a second particular identity into a second bucket such that the second bucket represents the second particular identity and contains at least one of a plurality of the items of the build task having the represented second identity, wherein the first identity and the second identity are unequal; and
executing the build task once for the first bucket and once for the second bucket.

19. The method of claim 18, further comprising automatically generating a plurality of assemblies.

20. The method of claim 18, further comprising automatically invoking an executable once per entry in a list.

21. The method of claim 18, further comprising filtering the plurality of items based on an attribute.

22. The method of claim 18, further comprising filtering the plurality of items based on a plurality of attributes.

23. The method of claim 18, further comprising processing only out-of-date batches as determined based on timestamp checking of each item.

24. The method of claim 18, wherein at least one item of the plurality of items is of a first type.

25. The method of claim 24, wherein executing the build task transforms the at least one item of the first type to an item of a second type.

26. A computer-readable medium comprising computer-executable instructions for:
receiving a project file comprising at least one build task, the at least one build task consuming a plurality of items, each of the plurality of items associated with an identity comprising a value for a set of attributes;
grouping items of the build task having a first particular identity into a first bucket such that the first bucket represents the first particular identity and contains at least one of a plurality of the items of the build task having the represented first identity;
grouping items of the build task having a second particular identity into a second bucket such that the second bucket represents the second particular identity and contains at least one of a plurality of the items of the build task having the represented second identity, wherein the first identity and the second identity are unequal; and
executing the build task once for the first bucket and once for the second bucket.

27. The computer-readable medium of claim 26, wherein executing the build task programmatically generates a plurality of assemblies.

28. The computer-readable medium of claim 26, wherein executing the build task programmatically invokes an executable once per entry in a list.

29. The computer-readable medium of claim 26, wherein executing the build task filters the plurality of items.

30. The computer-readable medium of claim 26, wherein executing the build task filters the plurality of items based on a plurality of attributes.

* * * * *